United States Patent
King et al.

(10) Patent No.: US 7,945,630 B2
(45) Date of Patent: May 17, 2011

(54) METHOD AND SYSTEM FOR VERIFYING A RECIPIENT OF A COMMUNICATION

(75) Inventors: Simon P. King, Berkeley, CA (US); Carrie Burgener, Berkeley, CA (US); Rahul Nair, Sunnyvale, CA (US); Christopher T. Paretti, San Francisco, CA (US); Marc Davis, San Francisco, CA (US); Chris W. Higgins, Portland, OR (US)

(73) Assignee: Yahoo! Inc., Sunnyvale, CA (US)

( * ) Notice: Subject to any disclaimer, the term of this patent is extended or adjusted under 35 U.S.C. 154(b) by 144 days.

(21) Appl. No.: 12/242,074

(22) Filed: Sep. 30, 2008

(65) Prior Publication Data

US 2010/0082757 A1    Apr. 1, 2010

(51) Int. Cl.
  *G06F 15/16* (2006.01)
(52) U.S. Cl. .......................................... 709/206; 715/752
(58) Field of Classification Search .................. 709/206; 715/752
  See application file for complete search history.

(56) References Cited

U.S. PATENT DOCUMENTS

| | | | |
|---|---|---|---|
| 7,254,573 B2 * | 8/2007 | Burke | 1/1 |
| 2002/0091773 A1 * | 7/2002 | Chowdhry et al. | 709/206 |
| 2004/0030604 A1 * | 2/2004 | Young | 705/26 |
| 2004/0133561 A1 * | 7/2004 | Burke | 707/3 |
| 2008/0168026 A1 * | 7/2008 | Patil et al. | 707/2 |

* cited by examiner

*Primary Examiner* — Liangche A Wang
(74) *Attorney, Agent, or Firm* — Brinks Hofer Gilson & Lione

(57) ABSTRACT

A method and system for communicating a message in an electronic messaging environment is provided. A method employed by the system may include generating a personalized communication model related to a user, determining the validity of a token associated with an intended recipient of the message based on information in the personalized communication model, extracting entities from the message, determining whether the entities extracted match the intended recipient, and indicating to the user whether the token is valid and whether the entities match the intended recipient. The tokens correspond to email addresses, phone numbers, and addresses associated with intended recipients. The personalized communication model includes the names and tokens associated with those individuals with whom the user communicates. The personalized communication model is seeded with information including social, spatial, temporal and logical information related to the user. The personalized communication model is generated by a network processor.

25 Claims, 9 Drawing Sheets

Personalized Communication Model

| Name | Channel | Token | Time | Location | Frequency |
|---|---|---|---|---|---|
| Joe Smith | Email | Joe@homemail.com | 5-7 PM | Anywhere | 5 |
| Joe Smith | Email | Joe@workmail.com | 9 AM-5 PM | Anywhere | 5 |
| Joe Smith | Telephone | 312-555-1212 | All day | Anywhere | 1 |
| Wife | Telephone | 312-444-1212 | 5-5:30 PM | On the road | 10 |

To: Joe Smith
From: Steve Jones

RE: Party Friday night

Hi Joe. See you at the party this Friday.

Be there or be square,
Steve

Fig. 7

METHOD AND SYSTEM FOR VERIFYING A RECIPIENT OF A COMMUNICATION

BACKGROUND

Electronic messaging has become one of the dominate forms for communicating messages. For example, many people utilize email programs, such as Yahoo! Mail®, to send messages and attachments. Electronic messaging has enabled individuals around the world to communicate with one another in nearly real-time. Other forms of electronics messaging, besides email, exist as well. For example, Internet message programs, such as Yahoo! Messenger®, enable individuals to "chat" with one another. Mobile devices, such as cellular telephones, are also often utilized to send electronics messages, such as photos, videos, SMS messages or email messages.

To utilize a typical messaging device, a sender of a communication typically specifies an intended recipient. For example, the sender may specify email addresses associated with the various intended recipients of the communication in a "To" field of an email program. However, in some cases, the email address of an intended recipient may not be known. To overcome this problem, some messaging systems predict the intended recipient via some form of string analysis. This typically involves searching through a personal directory that resides on the messaging device for individuals with names that match the characters in the string or text that the sender is entering. In the ideal situation, the list of potential recipients decreases as more and more characters are entered, until the list has been narrowed down to a single individual. Once identified, a token associated with the individual may be automatically entered. A token is a form of unique identifying data associated with an individual. For example, a token may correspond to an email address, a phone number, and/or an SMS address.

One problem with existing messaging devices and the messaging systems within which they operate is that they are unable to distinguish between different individuals with the same name. For example, two individuals may have the name John Smith. In this case, the sender would need to know the specific token associated with the correct John Smith, so as to send a communication to the correct John Smith.

In other instances, the sender may select what the sender thinks is the correct recipient when in reality the communication is intended for another. For example, the sender may address an email to Joe Smith, but may inadvertently attach a document addressed to John Smith. The question in this case becomes: Did the sender direct the message to the correct recipient or was the wrong document attached to the message?

BRIEF DESCRIPTION OF THE DRAWINGS

FIG. 3 illustrates an exemplary personalized communication model;

FIG. 7 is an exemplary attachment to a communication;

DETAILED DESCRIPTION OF THE DRAWINGS AND THE PRESENTLY PREFERRED EMBODIMENTS

The following figures describe an address quality engine (AQE) that may be utilized to overcome the limitations described above. As used herein, the terms "communication" and "message" are used interchangeably and refer to any form of electronic communication, such as email, SMS messaging, voice-over-IP (VOIP) communication, voice messages, photoblogging, and/or video communication.

Figure 1:
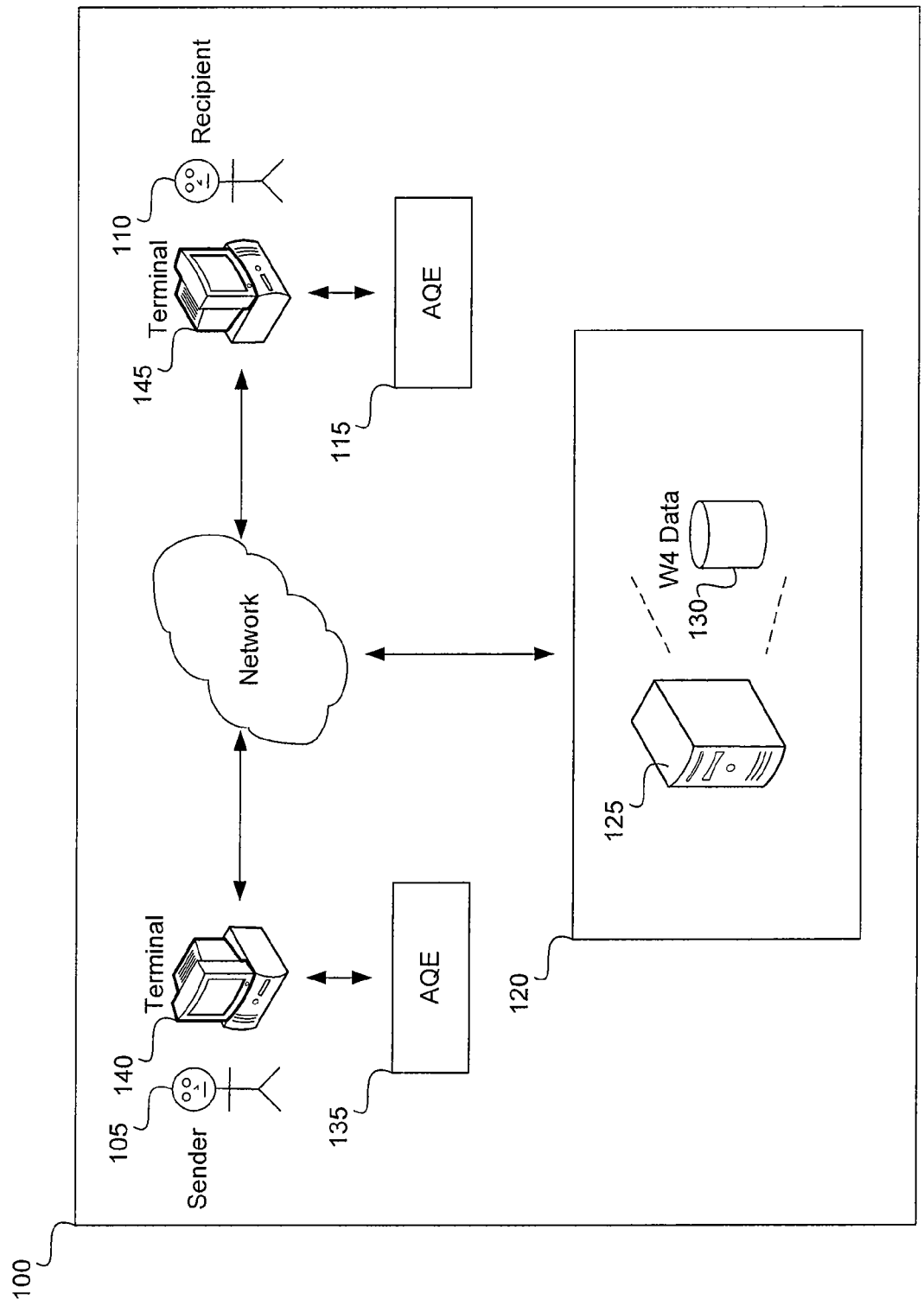
FIG. 1 illustrates an address quality engine (AQE) in a first arrangement in a communication environment.

FIG. 1 illustrates an AQE in a first arrangement in a communication environment 100. The communication environment 100 includes a sender 105, a sending terminal 140, a recipient 110, a receiving terminal 145, a sending terminal AQE 135, a receiving terminal AQE 115, and a network center 120.

The sending terminal 140 and receiving terminal 145 may correspond to any device capable of communicating messages. For example, the sending terminal 140 and receiving terminal 145 may correspond to any conventional computer or other data processing device, such as an Intel®, AMD®, or PowerPC® based computer operating a Microsoft Windows®, Linux, or other Unix® based operating system. The sending terminal 140 and receiving terminal 145 may include networking hardware that enables communications with other networked equipment. The sending terminal 140 and receiving terminal 145 may also include communication software, such as Microsoft Internet Explorer® and/or Yahoo! Mail®, that enables, for example, the communication of email messages with attachments.

Although depicted as computer terminals, the sending terminal 140 and receiving terminal 145 may also correspond to a mobile device adapted to communicate electronic messages, such as a telephone, mobile telephone, game or entertainment device, personal-information-device, and/or 2-way pager.

The sending terminal 140 may include a sending terminal AQE 135, and the receiving terminal 145 may include a receiving terminal AQE 115. An AQE is a specialized application that utilizes a personalized communication model for validating communications over various communication channels. For example, the AQE may be utilized in conjunction with IM chats, email, VOIP conversations, SMS logs, etc., and may operate as a real-time address-validity testing mechanism for both sending and receiving communications. In operation, the AQE may be utilized to select valid recipients for a given communication and may also be utilized to verify the accuracy of the communication itself. These operations are described in more detail below.

The network center 120 includes a network processor 125 and a W4 database 130. The network processor 125 may correspond to any conventional computer or other data processing device, such as an Intel®, AMD®, or PowerPC® based computer operating a Microsoft Windows®, Linux, or other Unix® based operating system. The network processor 125 may be adapted to communicate over a communication network, such as the Internet, and may communicate with the sending terminal 140 and receiving terminal 145 described above.

The W4 database is utilized to store social, spatial, temporal and logical data related to a specific user. The process for gathering and storing this information in the W4 database is described in U.S. patent application Ser. No. 11/953,454 SYSTEM AND METHOD FOR CONTEXTUAL ADDRESSING OF COMMUNICATIONS ON A NETWORK, which is hereby incorporated by reference. The network processor utilizes the information stored in the W4 database to seed a personalized communication model within the AQEs described above. For example, the network processor may locate a user, such as the sender 105 or recipient 110, in the W4 database, and then identify other individuals with whom the user communicates. Then, the names of the individuals, along with the communication channels commonly utilized by the individuals to communicate with the user, may be extracted. The time and place of the communications may also be extracted. Finally, tokens associated with the individuals may be extracted. As described above, tokens correspond to various forms of identifying data associated with an individual, such as an email address, a phone number, and/or an SMS address.

After seeding the personalized communication model, the network processor communicates the personalized communication model to an AQE on the network. For example, a personalized communication model tailored to the sender 105 may be communicated to the sending terminal 140 to be utilized by the sending terminal AQE 135 operating on the sending terminal 140. Similarly, a personalized communication model may be generated for the recipient 110 and communicated to a receiving terminal 145 to be utilized by a receiving terminal AQE 115 operating on the receiving terminal 145.

Figure 2:
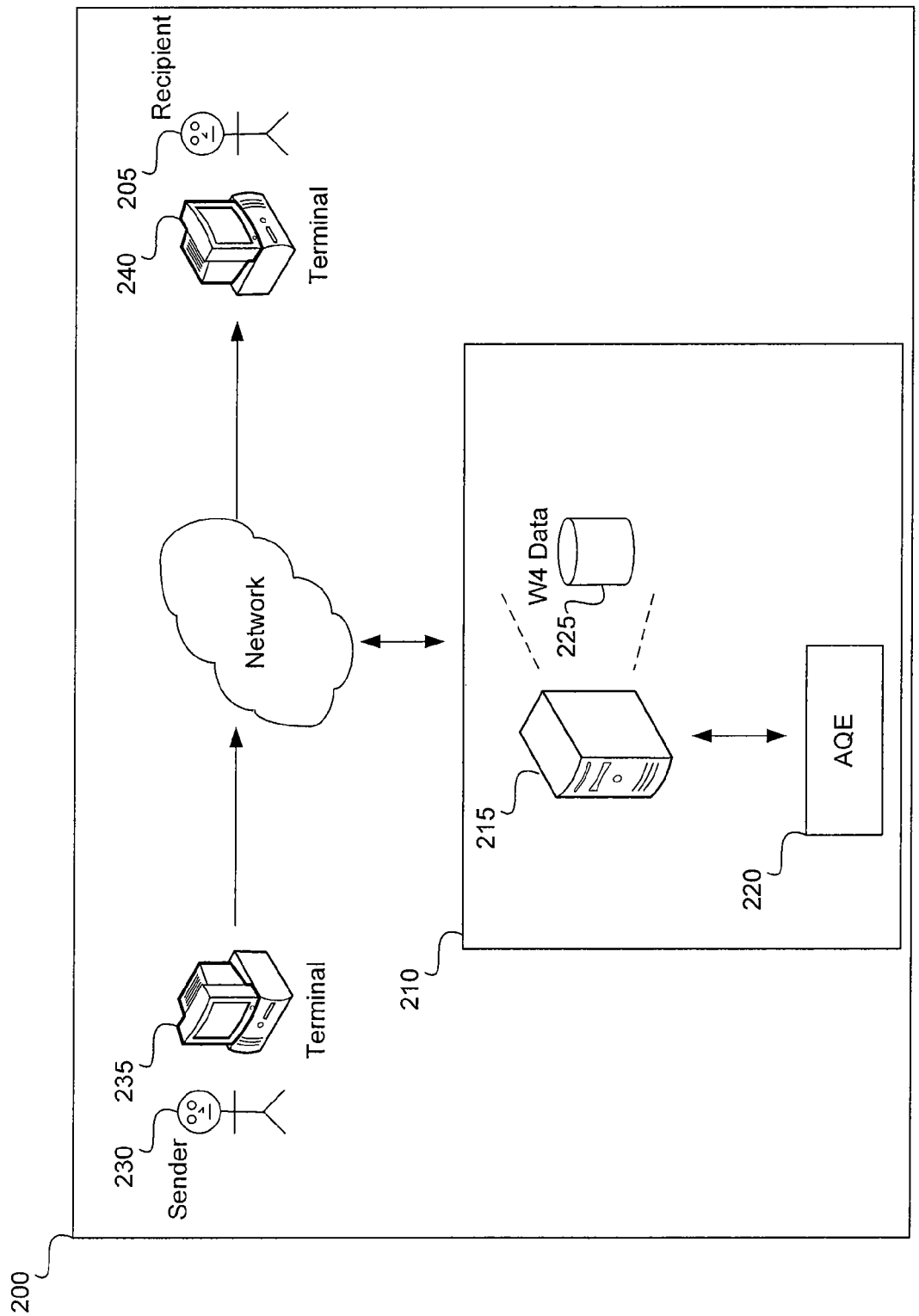
FIG. 2 illustrates an AQE in a second arrangement in a communication environment.

FIG. 2 illustrates an address quality engine (AQE) in a second arrangement in a communication environment 200. The communication environment 200 includes a sender 230, a sending terminal 235, a recipient 205, a receiving terminal 240, and a network center 210.

The sending terminal 235 and receiving terminal 240 may correspond to any device capable of communicating messages as described with reference to FIG. 1 above. For example, the sending terminal 235 and receiving terminal 240 may correspond to a computer, a telephone, mobile telephone, 2-way pager, or any other device utilized to communicate messages. Messages communicated between the sending terminal 235 and receiving terminal 240 may be routed through the network center 210 where validity and accuracy may be determined. That is, the network center 210 may act as a proxy for communicating messages between a sending terminal 235 and a receiving terminal 240.

The network center 210 includes a network processor 215, a W4 database 225, and an AQE 220. The network processor 215 may include the functionality of the network processor 125 of FIG. 1 and be further adapted to carry out the operations associated with the AQE 220. For example, the network processor 215 may utilize information in the W4 database 225 to seed a personalized communication model of a sender 230 and/or a recipient 205. The personalized communication model may be generated in real-time. For example, upon receiving a communication from the sender 230, the network processor may locate information related to the sender 230 in the W4 database 225 and generate a personalized communication model specifically tailored to the sender 230. The network processor 215 may also identify the intended recipients of the message communicated by the sender 230 and generate personalized communication models for identified recipients. The network processor 215 may then utilize the generated personalized communication models to verify the validity and accuracy of the communication. The operations involved in determining the validity and accuracy of a communication are described below.

FIG. 3 illustrates an exemplary personalized communication model 300. The exemplary personalized communication model includes a name column 305, channel column 310, token column 315, time column 320, location column 325, and frequency column 330. The rows correspond to various communication profiles associated with the user. The name column 305 lists the recipient corresponding to a communication profile. The channel column 310 lists the type of communication associated with the communication profile, such as email or telephone. The token column 315 lists the token associated with the communication profile. The time column 320 and location column 325 correspond to the time and location of messages communicated in accordance with the communication profile.

The frequency column 330 corresponds to a frequency with which the user communicates messages in accordance with the communication profile. The frequency may be specified in various ways. For example, the frequency may be specified as high, medium, or low or be represented numerically, for example, within a range of 1-10 where 10 corresponds to the highest frequency. The frequency information may be utilized to determine an intended recipient where it might otherwise be difficult to distinguish between individuals. For example, the user may communicate with individuals A and B, both having similar names, and utilizing the same communication channel, at the same time and same place. However, the user may communicate with individual A more frequently. In this case, user A may be selected by default when initiating an otherwise ambiguous communication.

As described above, a network processor utilizes social, spatial, temporal and logical data related to a specific user stored in a W4 database to seed the personalized communication model 300. For example, the network processor may extract the names, channels of communication, and various tokens associated with individuals with whom the user communicates. The time, place, and frequency of the communications may be extracted as well. The extracted information may then be utilized to seed a personalized communication model 300 tailored to the user. This information may be utilized by an AQE to determine the validity and accuracy of messages communicated between a sender and recipient.

The personalized communication model 300 shown corresponds to a personalized communication model 300 of a user with four communication profiles. The first communication profile indicates that the user communicates with an individual named Joe Smith between 5 PM and 7 PM via the email address joe@homemail.com. The second communication profile indicates that the user communicates with the same individual between 9 AM and 5 PM via the email address joe@workemail.com. The third communication profile indicates that the user communicates with the same individual via telephone. The fourth communication profile indicates that the user communicates with his wife, via telephone, between 5 PM and 5:30 PM while on the road.

In one embodiment, an AQE associated with the user may utilize this information to determine an intended recipient of a communication. For example, if the time were between 5 PM and 7 PM, and the user started entering Joe Smith as the recipient of an email message, the AQE may automatically retrieve and enter the email address joe@homemail.com in the "To:" portion of an email program. Similarly, if the time were between 9 AM and 5 PM, the email address joe@workemail.com may be retrieved. If the user turned on his AQE-enabled mobile phone on the road between 5 PM and 5:30 PM, the mobile device may automatically dial his wife.

Once the personalized communication model 300 is seeded, the information in the personalized communication model 300 may be supplemented with additional information gathered by an AQE. For example, the AQE may flag a communication as invalid or inaccurate when the intended recipient is not in the personalized communication model 300. The user, however, may indicate that the message is valid and/or accurate. In this case, the intended recipient, the channel of communication utilized, and the time and place of the communication may be added to the personalized communication model 300. Over time, the information in the personalized communication model may be tailored to more accurately reflect the communication preferences of the user. For example, the frequency at which the various communications occur may be tracked and added to the personalized communication model 300. Likewise, the types of communications, style and content of communications, the mode (work or personal) and the various topics contained in communications may also be tracked and added to the personalized communication model 300.

FIG. 4-FIG. 6 and FIG. 8 are flow diagrams that describe the various operations carried out by an AQE when sending or receiving a communication. The operations described below may be carried out on an AQE operating on a sending terminal, receiving terminal, a network processor, or any other device for processing communications.

Figure 4:
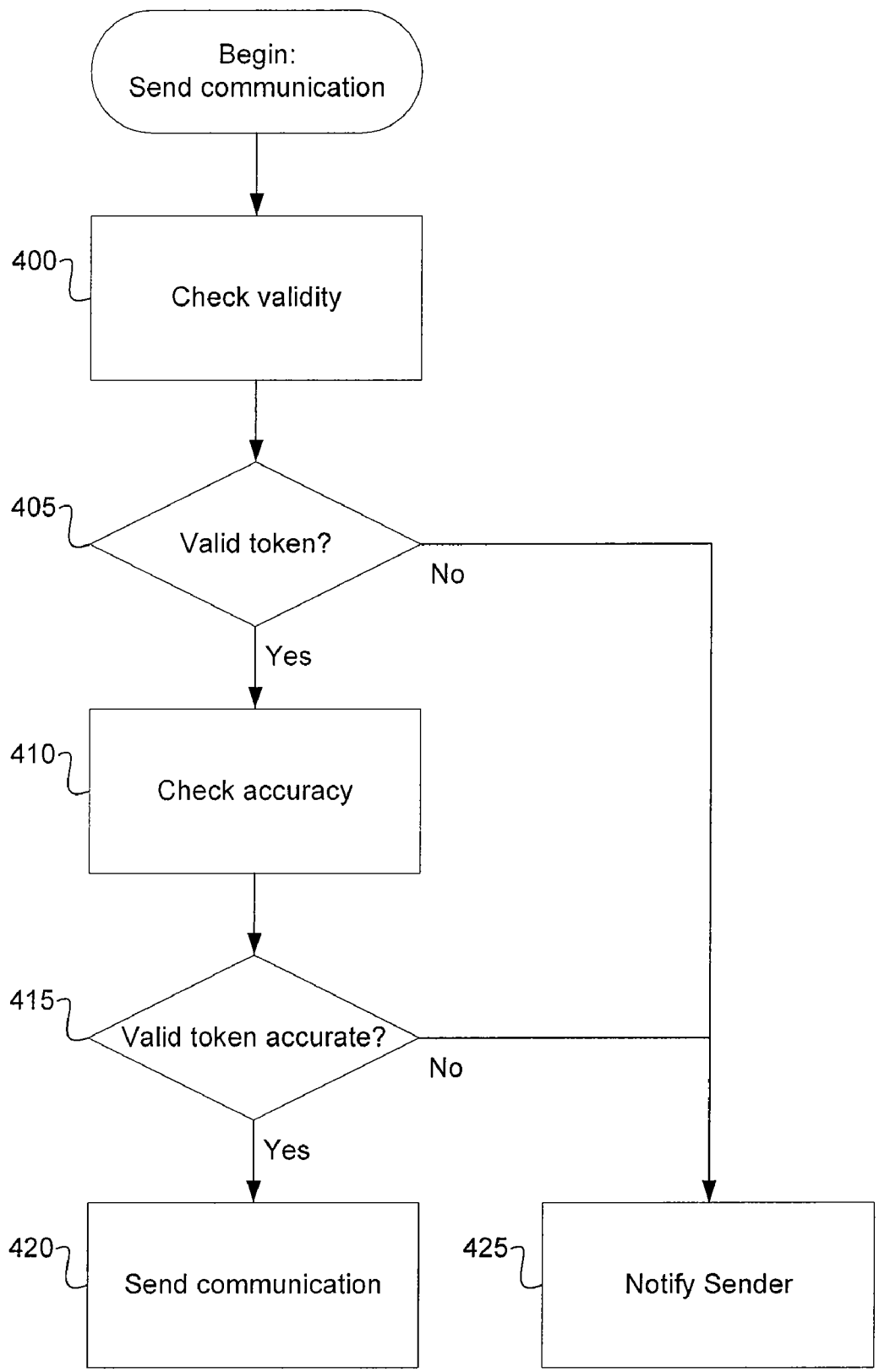
FIG. 4 is a flow diagram for sending a communication.
Figure 5:
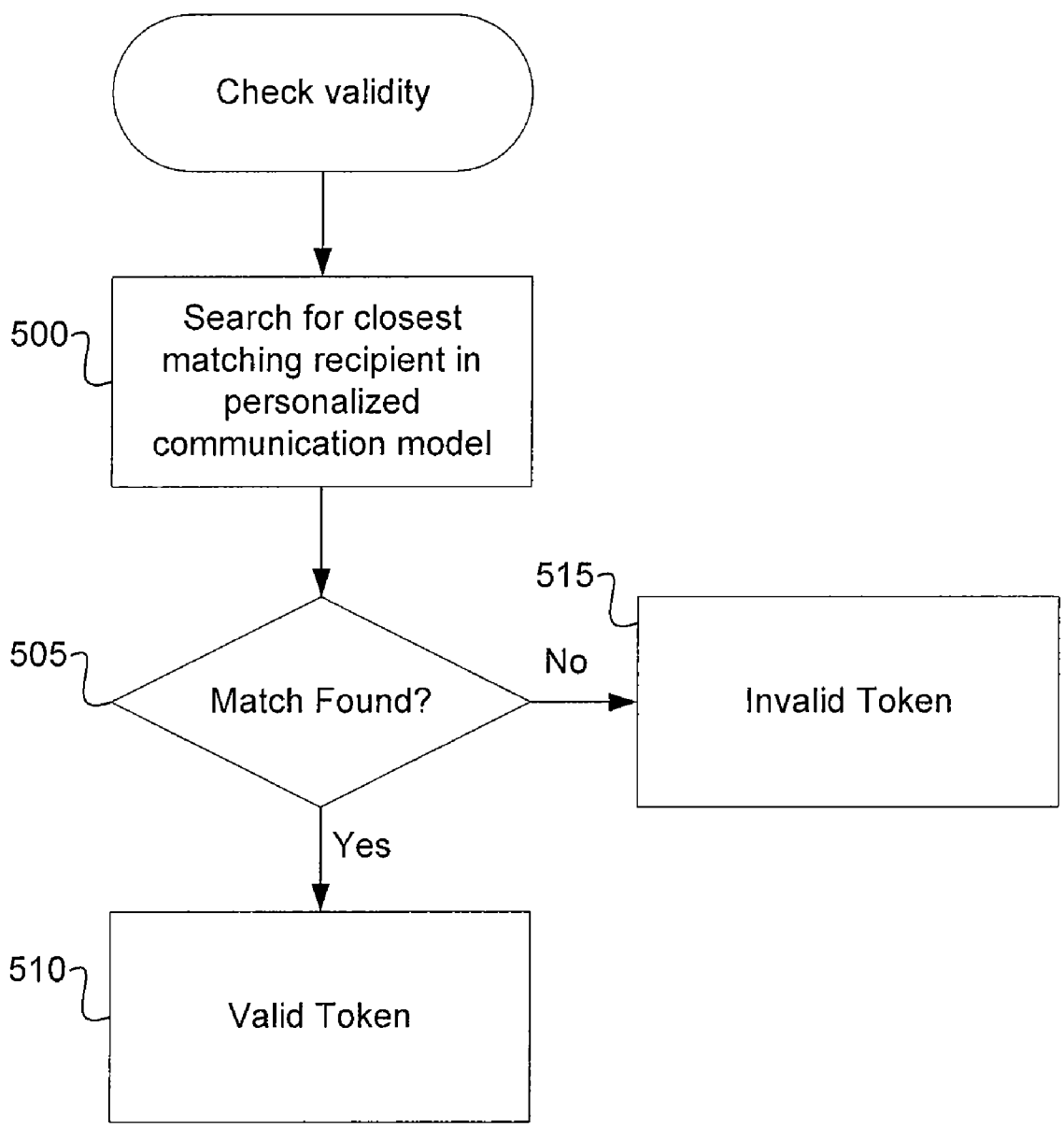
FIG. 5 is a flow diagram for verifying the validity of a token.

In FIG. 4, at block 400, the validity of a communication may be verified as described in FIG. 5.

Referring to FIG. 5, at block 500, the AQE may first search through a personalized communication model for a token that matches the recipient of the communication specified by a sender of the communication. In doing so, the AQE may take into consideration the channel of communication utilized along with the time and location of the communication. For example, referring to the exemplary personalized communication 300 of FIG. 3, if the sender begins entering the name "Joe Smith" via an email tool, such as Yahoo! Mail®, and the time is between 5 PM and 7 PM, the AQE will locate the token joe@homemail.com.

At block 505, if a match is located, then at block 510, the token is marked as valid. If a match is not located, then at block 515, the token may be flagged as invalid.

Referring back to FIG. 4, at block 405, if the token is invalid, then at block 425, the sender may be notified that no match was found. This may occur where the name entered does not exist in the personalized communication model. This may also occur where the name of the person exists, but the channel and/or time and place of the communication does not match the channel and/or time and place for communications that commonly occur between the sender and the named recipient. In this case, the sender may be provided with a choice of tokens for the particular individual. For example, if the sender entered the name "Joe Smith" at 6 AM in the morning, the sender may be provided a choice of tokens including the email addresses joe@homemail.com and joe@workemail.com.

Figure 6:
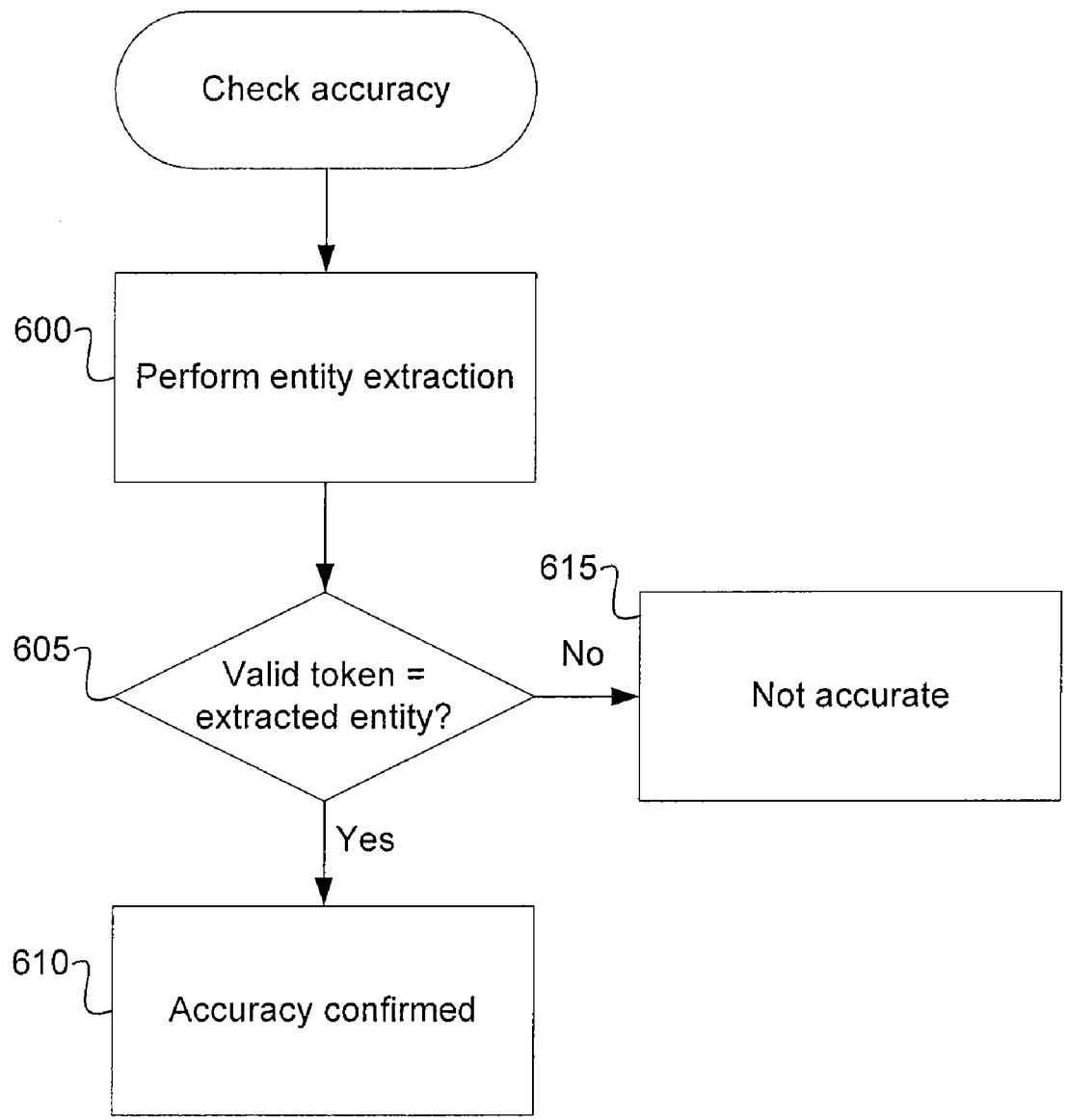
FIG. 6 is a flow diagram for verifying the accuracy of an intended communication.

If at block 405 the token is valid, then at block 410, the accuracy of the communication is determined as described in FIG. 6.

Referring to FIG. 6, at block 600, an entity extraction algorithm, such as the entity extraction algorithm described in U.S. application Ser. No. 11/953,454 SYSTEM AND METHOD FOR CONTEXTUAL ADDRESSING OF COMMUNICATIONS ON A NETWORK, incorporated by reference above, may be applied to the communication. Entity extraction corresponds to a set of operations for extracting known elements from communications in order to determine the intended recipients for a communication. In general, the entity extraction algorithm searches through a communication for terms corresponding to the 4 W's: who, what, where and when of both the communication itself, but also within the communication's content to identify any relevant people, places, objects, events, topics and times related to the communication. These extracted entities are then used to score the probability of the intended recipient as entered by the user.

When extracting entities, the entity extraction algorithm may examine any header fields and/or subject fields present in the communication as well as the historical communications and data models associated with the users contained therein. The entity extraction algorithm may also examine the body of a message, along with other parts of the communication, such as attachments or metadata associated with the communication as well as any historical communications and data models associated with the entities contained therein.

FIG. 7 is an exemplary communication 700 upon which entity extraction may be applied. In this example, the communication 700 may correspond to an email message or an attachment to an email message. The entity extraction algorithm may parse the messages so as to determine who and what the communication 700 is about as well as to identify any relevant times and locations related to the communication 700. For example, the entity extraction algorithm may determine who the message is about by locating terms, such as "To:" and "From:", and extracting text near the terms. In this example, the entity extraction algorithm may determine the communication is related to individuals named Joe Smith and Steve Jones. The entity extraction algorithm may also determine the communication is related to an event, such as a party that is to occur on Friday. The style of the communication 700 may also be determined. For example, in the exemplary communication 700, the entity extraction algorithm may detect the text "Be there or be square" at the bottom the communication 700 and determine that the communication 700 is personal in nature versus work related.

Referring back to FIG. 6, after the entities associated with the communication are identified, at block 605, a determination is made as to whether the previously identified token is related to the extracted entities. For example, if the previously identified token is joe@homemail.com and one of the entities extracted from the communication is Joe Smith, the accuracy of the communication may be confirmed. In this case, at block 610, the communication may be flagged as accurate.

If, on the other hand, the extracted entity was another individual, then at block 615, the communication may be flagged as inaccurate.

The communication may also be flagged as inaccurate where the determined style of the communication does not match the previously identified token. For example, if the style of the communication is personal in nature and a non-personal token, such as a work email address, was previously identified, the communication may be flagged as inaccurate.

Referring back to FIG. 4, at block 415, if the token is accurate, then at block 420, the message may be communicated. If the communication is not accurate, then at block 425, the sender may be notified as such. For example, the sender may be asked whether he wishes to continue sending the message. In addition or alternatively, the sender may be provided with a choice of alternative tokens based on the entities extracted from the communication. For example, a message, such as "Did you really mean to send the message to joe@homemail.com?", may be presented to the sender.

Figure 8:
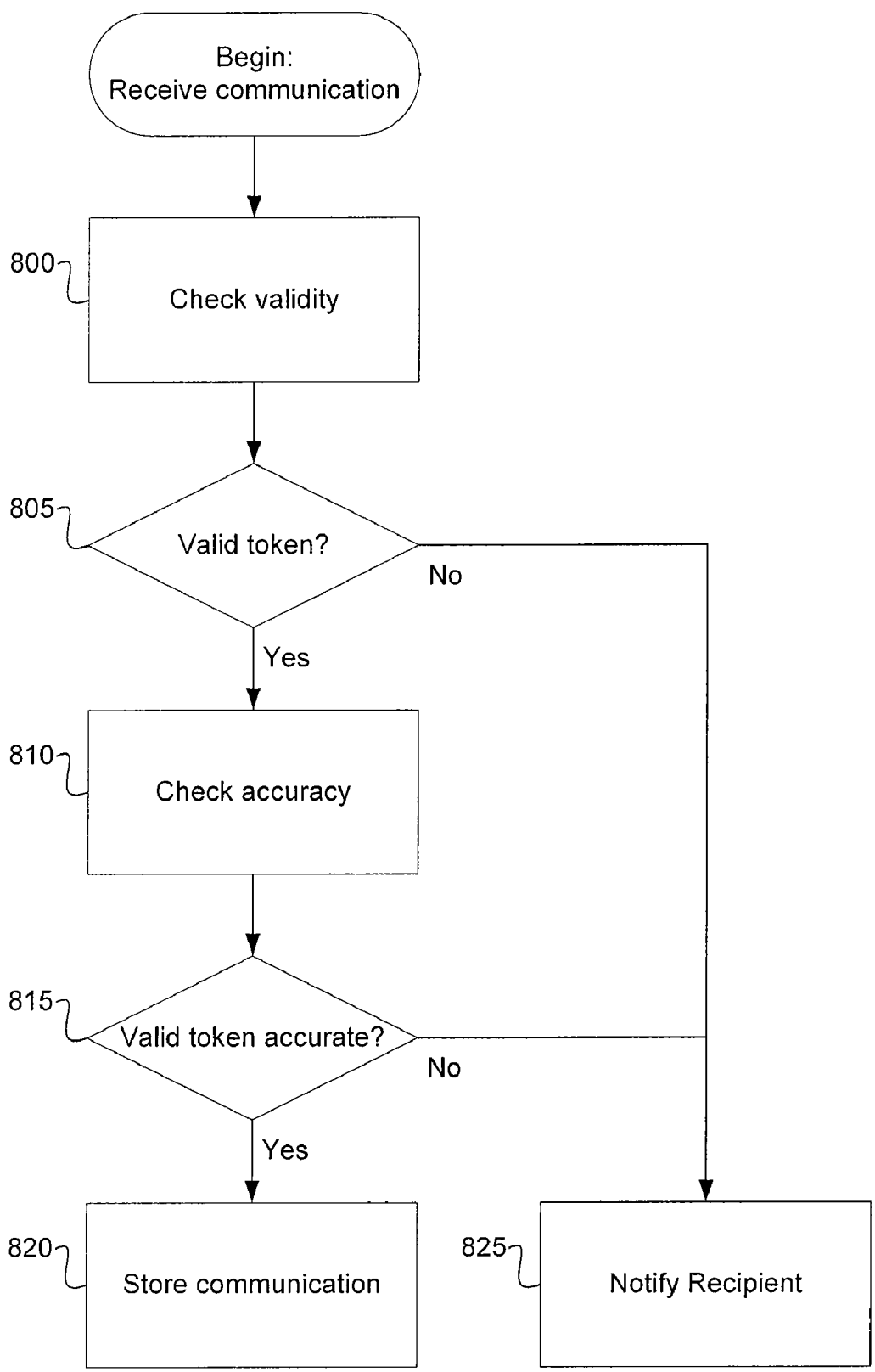
FIG. 8 is a flow diagram for receiving a communication.

FIG. 8 is a flow diagram for receiving a communication. At block 800, the validity of a communication may be verified in much the same way as described in FIG. 5. In this case, however, the determination of validity may be based on the token associated with the sender. A personalized communication model associated with the recipient of the communication may be searched for tokens that match the sender of the communication. As described above, channels of communication, times, and places are taken into consideration in making this determination. At block 805, if the token is not valid, then at block 825, the recipient may be notified. In addition or alternatively, the communication may be placed in a folder, such as a junk message folder.

At block 805, if the token is valid, then at block 810, the accuracy of the communication is verified. This involves performing entity extraction on the communication so as to determine whether the communication was actually intended for this recipient as described with reference to FIG. 6.

At block 815, if the communication is accurate, then at block 820, the communication may be stored on the receiving terminal and/or displayed to the recipient. At block 815, if the communication is not accurate, then at block 825, the recipient may be notified and/or the communication may be placed in a folder, such as a junk message folder.

Figure 9:
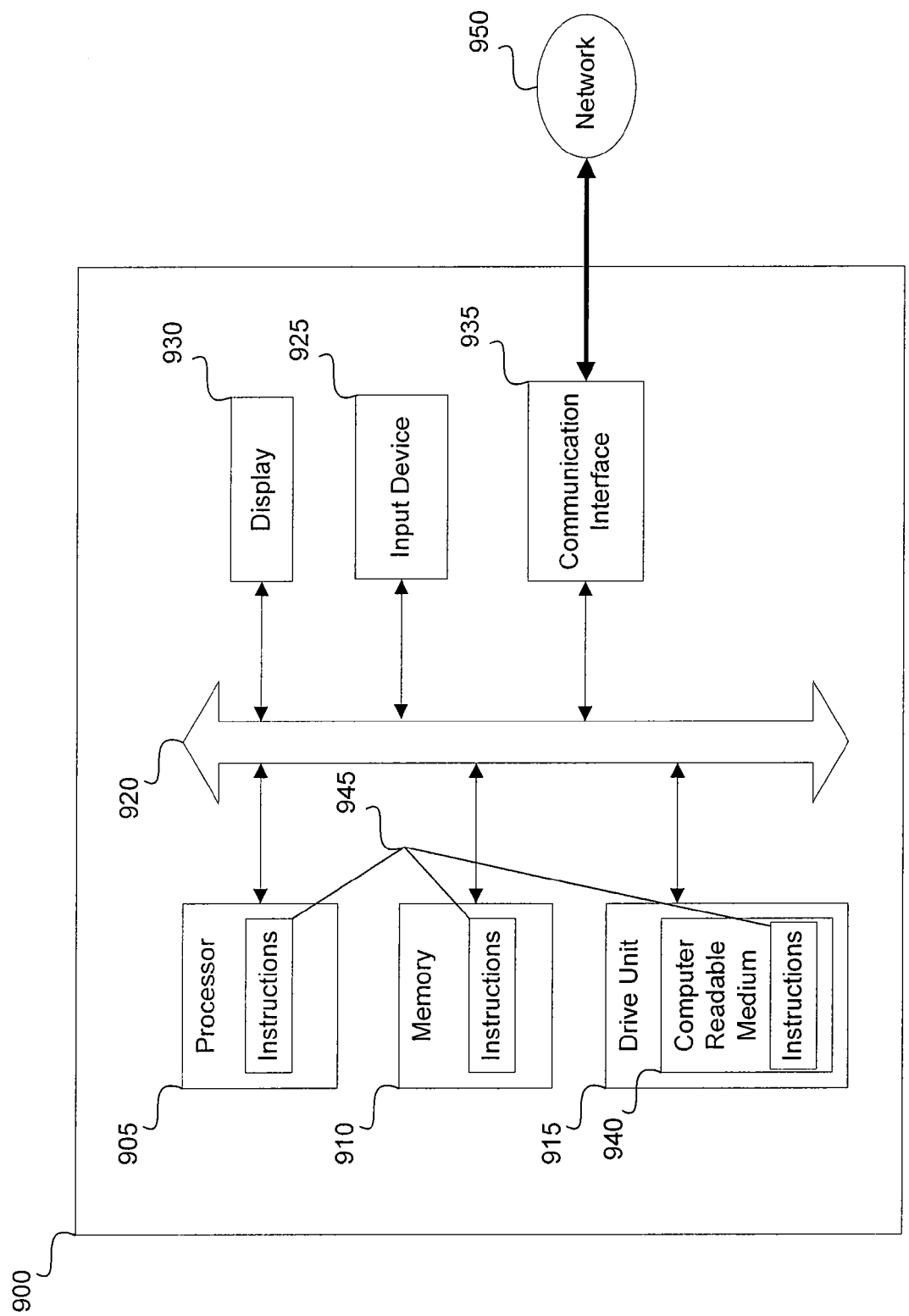
FIG. 9 illustrates a general computer system, which may represent any of the computing devices referenced herein.

FIG. 9 illustrates a general computer system 900, which may represent the network processor 125, sending terminal 140, and/or receiving terminal 145 of FIG. 1, or any of the other computing devices referenced herein. The computer system 900 may include a set of instructions 945 that may be executed to cause the computer system 900 to perform any one or more of the methods or computer-based functions disclosed herein. The computer system 900 may operate as a stand-alone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 900 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 945 (sequential or otherwise) that specify actions to be taken by that machine. In one embodiment, the computer system 900 may be implemented using electronic devices that provide voice, video or data communication. Further, while a single computer system 900 may be illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 905, such as a central processing unit (CPU), a graphics processing unit (GPU), or both. The processor 905 may be a component in a variety of systems. For example, the processor 905 may be part of a standard personal computer or a workstation. The processor 905 may be one or more general processors, digital signal processors, application specific integrated circuits, field programmable gate arrays, servers, networks, digital circuits, analog circuits, combinations thereof, or other now known or later-developed devices for analyzing and processing data. The processor 905 may implement a software program, such as code generated manually (i.e., programmed).

The computer system 900 may include a memory 910 that can communicate via a bus 920. For example, the W4 database 130, of FIG. 1 may be stored in the memory. The memory 910 may be a main memory, a static memory, or a dynamic memory. The memory 910 may include, but may not be limited to, computer readable storage media such as various types of volatile and non-volatile storage media including, but not limited to, random access memory, read-only memory, programmable read-only memory, electrically programmable read-only memory, electrically erasable read-only memory, flash memory, magnetic tape or disk, optical media and the like. In one case, the memory 910 may include a cache or random access memory for the processor 905. Alternatively or in addition, the memory 910 may be separate from the processor 905, such as a cache memory of a processor, the system memory, or other memory. The memory 910 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 910 may be operable to store instructions 945 executable by the processor 905. The functions, acts or tasks illustrated in the figures or described herein may be performed by the programmed processor 905 executing the instructions 945 stored in the memory 910. The functions, acts or tasks may be independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 900 may further include a display 930, such as a liquid crystal display (LCD), an organic light emitting diode (OLED), a flat panel display, a solid state display, a cathode ray tube (CRT), a projector, a printer or other now known or later-developed display device for outputting determined information. The display 930 may act as an interface for the user to see the functioning of the processor 905, or specifically as an interface with the software stored in the memory 910 or in the drive unit 915.

Additionally, the computer system 900 may include an input device 925 configured to allow a user to interact with any of the components of system 900. The input device 925 may be a number pad, a keyboard, or a cursor control device, such as a mouse, or a joystick, touch screen display, remote control or any other device operative to interact with the system 900.

The computer system 900 may also include a disk or optical drive unit 915. The disk drive unit 915 may include a computer-readable medium 940 in which one or more sets of instructions 945, e.g. software, can be embedded. Further, the instructions 945 may perform one or more of the methods or logic as described herein. The instructions 945 may reside completely, or at least partially, within the memory 910 and/or within the processor 905 during execution by the computer system 900. The memory 910 and the processor 905 also may include computer-readable media as discussed above.

The present disclosure contemplates a computer-readable medium 940 that includes instructions 945 or receives and executes instructions 945 responsive to a propagated signal; so that a device connected to a network 950 may communicate voice, video, audio, images or any other data over the network 950. The instructions 945 may be implemented with hardware, software and/or firmware, or any combination thereof. Further, the instructions 945 may be transmitted or received over the network 950 via a communication interface 935. The communication interface 935 may be a part of the processor 905 or may be a separate component. The communication interface 935 may be created in software or may be a physical connection in hardware. The communication interface 935 may be configured to connect with a network 950, external media, the display 930, or any other components in system 900, or combinations thereof. The connection with the network 950 may be a physical connection, such as a wired Ethernet connection or may be established wirelessly as discussed below. Likewise, the additional connections with other components of the system 900 may be physical connections or may be established wirelessly.

The network 950 may include wired networks, wireless networks, or combinations thereof. The wireless network may be a cellular telephone network, an 802.11, 802.16, 802.20, or WiMax network. Further, the network 950 may be a public network, such as the Internet, a private network, such as an intranet, or combinations thereof, and may utilize a variety of networking protocols now available or later developed including, but not limited to, TCP/IP based networking protocols.

The computer-readable medium 940 may be a single medium, or the computer-readable medium 940 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 940 may include a solid-state memory such as a memory card or other package that houses one or more non-volatile read-only memories. The computer-readable medium 940 also may be a random access memory or other volatile re-writable memory. Additionally, the computer-readable medium 940 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

Accordingly, the method and system may be realized in hardware, software, or a combination of hardware and software. The method and system may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The method and system may also be embedded in a computer program product, which includes all the features enabling the implementation of the methods described herein and which, when loaded in a computer system, is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

From the foregoing, it may be seen that the embodiments disclosed herein provide an approach for verifying the validity and accuracy of a communication. For example, a personalized communication model may be seeded with information that characterizes a users communications. The information may include the names and tokens of individuals with whom the user communicates. The information may also include the channels of communications, along with time and the place of the communications and frequency of communications.

The personalized communication model may then be utilized by an address quality engine (AQE) to verify the validity and accuracy of communications between a sender and a recipient. The AQE may reside on terminals associated with the sender and recipient or may reside within a network center acting as a proxy for communications.

While the method and system has been described with reference to certain embodiments, it will be understood by those skilled in the art that various changes may be made and equivalents may be substituted without departing from the scope. In addition, many modifications may be made to adapt a particular situation or material to the teachings without departing from its scope. Therefore, it is intended that the present method and system not be limited to the particular embodiment disclosed, but that the method and system include all embodiments falling within the scope of the appended claims.

We claim:

1. An electronic messaging method comprising:
    generating, by a network processor, a personalized communication model associated with a sender of a communication, wherein the personalized communication model defines statistical information related to the occurrence of previous communications between the sender and one or more recipients of the communications, wherein the statistical information enables the determination of a likelihood that the sender actually meant to send the communication to the one or more recipients;
    determining, by an address quality engine, whether a token specified by the sender that defines a recipient of the communication matches an intended recipient of the communication from the sender based on the statistical information defined by the personalized communication model; and
    indicating to the sender that the intended recipient does not match the recipient associated with the token when the token is determined to not match the intended recipient.

2. The electronic messaging method according to claim 1, further comprising:

extracting entities from the communication;
determining whether the entities extracted match the intended recipient; and
indicating to the sender whether the entities match the intended recipient.

3. The electronic messaging method according to claim 1, wherein the personalized communication model includes identifying data associated with an individual with whom the sender communicates, the identifying data including a name and at least one token associated with the individual.

4. The electronic messaging method according to claim 1, wherein the personalized communication model identifies a communication channel utilized for communicating communications and a time when and place where the communication channel is utilized.

5. The electronic messaging method according to claim 1, wherein the token corresponds to at least one of: an email address, a phone number, and an address associated with an intended recipient.

6. The electronic messaging method according to claim 1, further comprising seeding the personalized communication model based on at least one of: social, spatial, temporal and logical information related to the sender.

7. The electronic messaging method according to claim 2, wherein entities are extracted from at least one of: a header portion of a communication, a subject portion of a communication, a body portion of a communication, metadata associated with the communication, and a document attached to the communication.

8. The electronic messaging method according to claim 1, further comprising:
communicating the personalized communication model from a network processor to at least one of: a sending terminal, and a receiving terminal;
wherein the network processor generates the personalized communication model.

9. The electronic messaging method according to claim 8, further comprising:
updating the personalized communication model based on a communication communicated by the sender.

10. The electronic messaging method according to claim 1, wherein the personalized communication model is generated and maintained by a network processor acting as a proxy for communications between a sending terminal and a receiving terminal.

11. A non-transitory machine-readable storage medium having stored thereon, a computer program comprising at least one code section for carrying out electronic messaging acts, the at least one code section being executable by a machine for causing the machine to perform acts of:
generating a personalized communication model associated with a sender of a communication, wherein the personalized communication model defines statistical information related to the occurrence of previous communications between the sender and one or more recipients of the communications, wherein the statistical information enables the determination of a likelihood that the sender actually meant to send the communication to the one or more recipients;
determining whether a token specified by the sender that defines a recipient of the communication matches an intended recipient of the communication from the sender based on the statistical information defined by the personalized communication model; and
indicating to the sender that the intended recipient does not match the recipient associated with the token when the token is determined to not match the intended recipient.

12. The non-transitory machine-readable storage according to claim 11, wherein the at least one code section comprises code that enables:
extracting entities from the communication;
determining whether the entities extracted match the intended recipient; and
indicating to the sender whether the entities match the intended recipient.

13. The non-transitory machine-readable storage according to claim 11, wherein the personalized communication model includes identifying data associated with an individual with whom the sender communicates, the identifying data including a name and at least one token associated with the individual.

14. The non-transitory machine-readable storage according to claim 11, wherein the personalized communication model includes a communication channel utilized for communicating communications and a time when and place where the communication channel is utilized.

15. The non-transitory machine-readable storage according to claim 12, wherein entities are extracted from at least one of: a header portion of a communication, a subject portion of a communication, a body portion of a communication, metadata associated with the communication, and a document attached to the communication.

16. The non-transitory machine-readable storage according to claim 11, wherein the personalized communication model is generated by a network processor and communicated to at least one of: a sending terminal, and a receiving terminal.

17. The non-transitory machine-readable storage according to claim 16, wherein the personalized communication model is updated with additional information when the sender communicates communications.

18. The non-transitory machine-readable storage according to claim 11, wherein the personalized communication model is generated and maintained by a network processor acting as a proxy for communications between a sending terminal and a receiving terminal.

19. A system for electronic messaging, the system comprising:
a network processor with circuitry operable to generate a personalized communication model associated with a sender of a communication, wherein the personalized communication model defines statistical information related to the occurrence of previous communications between the sender and one or more recipients of the communications, wherein the statistical information enables the determination of a likelihood that the sender actually meant to send the communication to the one or more recipients;
an address quality engine configured to determine whether a token specified by the sender that defines a recipient of the communication matches an intended recipient of the communication from the sender based on the statistical information defined by the personalized communication model; and indicate to the sender that the intended recipient does not match the recipient associated with the token when the token is determined to not match the intended recipient.

20. The system according to claim 19, further comprising circuitry operable to extract entities from the communication, determine whether the entities extracted match the intended recipient, and indicate to the sender whether the entities match the intended recipient.

21. The system according to claim 19, wherein the personalized communication model includes identifying data associated with an individual with whom the sender communicates, the identifying data including a name and at least one token associated with the individual.

22. The system according to claim 19, wherein the personalized communication model includes a communication channel utilized for communicating communications and a time when and place where the communication channel is utilized.

23. The system according to claim 19, wherein entities are extracted from at least one of: a header portion of a communication, a subject portion of a communication, a body portion of a communication, metadata associated with the communication, and a document attached to the communication.

24. The system according to claim 19, wherein the personalized communication model is generated by a network processor and communicated to at least one of: a sending terminal, and a receiving terminal, and wherein the personalized communication model is updated with additional information when the sender communicates communications.

25. The system according to claim 19, wherein the personalized communication model is generated and maintained by a network processor acting as a proxy for communications between a sending terminal and a receiving terminal.

* * * * *